United States Patent [19]

Throckmorton

[11] 4,028,272
[45] June 7, 1977

[54] PROCESS OF POLYMERIZATION OF CONJUGATED DIOLEFINS USING IRON CATALYSTS AND SULFUR LIGANDS

[75] Inventor: Morford C. Throckmorton, Akron, Ohio

[73] Assignee: The Goodyear Tire & Rubber Company, Akron, Ohio

[22] Filed: July 31, 1975

[21] Appl. No.: 600,684

Related U.S. Application Data

[62] Division of Ser. No. 526,356, Nov. 22, 1974, Pat. No. 3,936,432.

[52] U.S. Cl. .......................... 252/429 B; 252/428; 252/431 R; 252/431 C; 252/431 N; 526/140
[51] Int. Cl.² .......................................... C08F 4/70
[58] Field of Search ....... 252/429 B, 431 C, 431 N, 252/431 R, 428

[56] References Cited

UNITED STATES PATENTS

| 3,026,311 | 3/1962 | Coover et al. | 252/429 B X |
|---|---|---|---|
| 3,457,186 | 7/1969 | Marsico | 252/431 C X |
| 3,510,465 | 5/1970 | Nakaguti et al. | 252/429 B X |
| 3,629,222 | 12/1971 | Coover et al. | 252/429 B X |
| 3,644,223 | 2/1972 | Hashimoto et al. | 252/431 C X |
| 3,677,968 | 7/1972 | Bozik et al. | 252/431 N X |

*Primary Examiner*—Patrick P. Garvin
*Attorney, Agent, or Firm*—F. W. Brunner; J. Y. Clowney

[57] ABSTRACT

A process of polymerizing conjugated diolefinic monomers containing from 4 to about 12 carbon atoms to high molecular weight polymers by bringing said monomers into contact with a catalyst system consisting of (1) an iron-containing compound, (2) an organometallic reducing agent from Groups I and III of the Periodic Table, and (3) a sulfur or oxygen containing ligand.

2 Claims, No Drawings

PROCESS OF POLYMERIZATION OF CONJUGATED DIOLEFINS USING IRON CATALYSTS AND SULFUR LIGANDS

This is a division of application Ser. No. 526,356 filed 11-22-74, now U.S. Pat. No. 3,936,432 issued Feb. 3, 1976.

This invention is directed to a method of polymerization of conjugated diolefins containing from 4 to about 12 carbon atoms to form homopolymers and copolymers. It is also directed to the catalyst systems used to prepare these polymers. These polymers have utility in tires and other rubber products.

More specifically, this invention is directed to the use of iron containing compounds in conjunction with sulfur or oxygen containing ligands as effective catalysts for polymerization of conjugated diolefins to high molecular weight polymers.

A variety of compounds are utilized as catalysts to convert monomeric materials which are capable of being polymerized into high molecular weight polymers. However, the specific types of catalyst components utilized in the instant invention have heretofore not been disclosed.

The catalyst system used in the instant application has several advantages over some of the well known prior art catalyst systems utilizing other transfer metals.

Some catalyst systems utilizing nickel as one of its components can polymerize a monomer such as butadiene but cannot effectively polymerize isoprene or copolymerize isoprene and piperylene. The particular catalyst system of the instant invention has a rather broad general range of uses. It can polymerize and copolymerize a variety of conjugated diolefins and can also polymerize certain isomeric monomer forms that some of the prior art catalyst systems can not successfully polymerize. The advantages of the present catalyst system are that it is a general purpose catalyst system, capable of polymerizing a variety of monomers to give polymers with a high degree of stereo regularity, yet able to polymerize to high yields without excessively long polymerization times to give this wide range of polymers with varied physical characteristics. It can also tolerate much higher levels of several frequent impurities that are present in these types of solution polymerization systems, i.e. acetylenes, olefins, cyclopentene and cyclopentadiene.

According to the invention, conjugated diolefinic monomers containing from 4 to about 12 carbon atoms, are polymerized to high molecular weight polymers by bringing said monomers into contact with a catalyst system consisting of (1) an iron containing compound, (2) an organometallic reducing agent from Groups I and III of the Periodic Table, and (3) a sulfur or oxygen containing ligand.

The iron containing compounds of this invention are those which are capable of being reduced. Iron compounds which can be utilized in this invention are salts of carboxylic acids, organic complex compounds of iron, salts of inorganic acids and iron carbonyls. Representative of the iron compounds are ferric oxalate, ferric hexanoate, ferric octanoate, ferric decanoate, ferric stearate, ferric naphthenate, ferrous acetylacetonate, ferric acetylacetonate, ferric-1-ethoxy-1,3-butanedionate, ferrous dimethyl glyoxime, ferric chloride, ferrous chloride, ferric bromide, ferric phosphate, iron tetracarbonyl, iron pentacarbonyl and iron nonacarbonyl. Iron compounds which are soluble in hydrocarbons are preferred. The preferred representatives of these iron compounds are iron octanoate, iron decanoate, ferric acetylacetonate and iron naphthenate.

The organometallic compounds useful in this invention are organocompounds of such metals as aluminum, lithium and sodium. By the term "organometallic" is meant alkyl, cycloalkyl, aryl, arylalkyl, alkaryl radicals are attached to the metal to form the organocompounds of the particular metal.

Of the organometallic compounds useful in this invention, it is preferred to use organoaluminum compounds.

By the term "organoaluminum compound" is meant any organoaluminum compound responding to the formula:

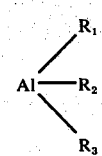

in which $R_1$ is selected from the group consisting of alkyl (including cycloalkyl), aryl, alkaryl, arylalkyl, alkoxy, hydrogen, cyanogen and halogen, $R_2$ and $R_3$ being selected from the group of alkyl (including cycloalkyl), aryl, alkaryl, and arylalkyl. Representative of the compounds responding to the formula set forth above are: diethylaluminum fluoride, diethylaluminum chloride, di-n-butylaluminum chloride, diisobutylaluminum chloride, dioctylaluminum chloride, diphenylaluminum chloride, diethylaluminum bromide and diethylaluminum iodide. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenyl ethylaluminum hydride, phenyl-n-propylaluminum hydride, p-tolyl ethylaluminum hydride, benzyl-n-propylaluminum hydride, and other organoaluminum hydrides. Also included are trimethylaluminum, triethylaluminum, tri-n-propylaluminum, triisobutylaluminum, tri-n-butylaluminum, tripentylaluminum, trihexylaluminum, tricyclohexylaluminum, trioctylaluminum, triphenylaluminum, tri-p-tolylaluminum, tribenzylaluminum, ethyl diphenylaluminum, ethyl di-p-tolylaluminum, ethyl dibenzylaluminum, diethyl phenylaluminum, diethyl p-tolylaluminum, diethyl benzylaluminum and other triorganoaluminum compounds. Also included are diethylaluminum cyanide, diethylaluminum ethoxide, diisobutylaluminum ethoxide and dipropylaluminum methoxide. Ethylaluminum dichloride and ethylaluminum sesquichloride also may be used as the organoaluminum compound.

By the term "organolithium compounds" is meant any organolithium compound responding to the formula R-Li where R is an alkyl, alkaryl, arylalkyl or aryl group. Representative among the compounds responding to the formula set forth above are ethyllithium, propyllithium, n-, secor t-butyllithium, hexyllithium, styryllithium or phenyllithium. The term "organolithium compounds" also refers to catalysts responding to the formula Li-R-R-40 -Li such as difunctional lithium catalysts, for example, DiLi-1, DiLi-3 and the like, which are produced by Lithium Corporation of America.

Organosodium compounds include tetraethyl sodium aluminum and diethyl sodium aluminum dihydride.

Also, by the term "organolithium aluminum compounds" is meant any compound responding to the formula R'R''$_3$LiAl where R' and R'' may be hydrogen, alkyl, alkaryl, or arylalkyl groups. R' and R'' may or may not be the same. Representative of these compounds are tetraethyl lithium aluminum, n-butyl-triisobutyl lithium aluminum, tetrabutyllithium aluminum, tetraisobutyllithium aluminum, butyl triethyl lithium aluminum, styryl tri-normal propyl lithium aluminum, triethyl lithium aluminum hydride and diethyl lithium aluminum dihydride.

The sulfur or oxygen containing ligand used in the practice of this invention must contain at least two (2) functional groups which can coordinate with the iron. The functional groups are a combination of (a) two thio groups which are attached to different carbon atoms, (b) a mercapto and an imino, imine or an imidazole group, (c) a hydroxyl and an imino, imine or an imidazole group, or (d) a thio and an amine or imino group.

Representative of these classes of ligands are:
a. N,N'-dimethyldithiooxamide

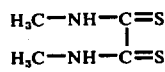

dithiooxamide, N,N'-dicyclohexyldithiooxamide, and N,N'-didodecyldithiooxamide;
b. 2-mercaptobenzimidazole

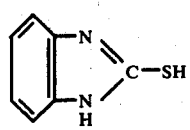

5-methyl-2-mercaptobenzimidazole and 5-chloro-2-mercaptobenzimidazole;
c. 2-hydroxybenzimidazole; and
d. thiourea, N,N'-diphenylthiourea and the like,

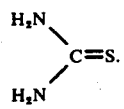

The dithiooxamides listed in the (a) class above could also be included in the (d) class since the dithiooxamides are comprised of two R-NH-C=S (thiocarbamoyl) groups.

This three-component catalyst system has polymerization activity over a wide range of catalyst concentrations and catalyst ratios. The three catalyst components interreact to form the active catalysts. As a result, the optimum concentration for any one catalyst is very dependent upon the concentrations of each of the other two catalyst components. Furthermore, while polymerization will occur over a wide range of concentrations and ratios, polymers having the most desirable properties are obtained over a narrower range.

The molar ratio of the organometallic compound when it is a triorganometallic to the iron compound Al/Fe can be varied from about 1/1 to about 400/1; however, a more preferred range of Al/Fe is from about 1/1 to about 4/1, however, when the organometallic compound contains a hydrogen atom, alkoxy group or halide, then the organometallic component to the iron compound AlX/Fe can be varied from about 6/1 to about 25/1 or a more preferred ratio of about 12/1, and when the organometallic compound is an organolithium compound then a desirable molar ratio of organometallic compound to the iron compound Li/Fe is about 6/1.

The molar ratio of the sulfur ligand to the iron compound S/Fe can be varied depending on which sulfur compound is utilized, however, a range of about 0.1/1 to about 100/1 can be used, with a more preferred range of S/Fe from about 0.3/1 to about 3/1.

The three catalyst components may be charged to the polymerization system as separate catalyst components in either a stepwise or a simultaneous manner, sometimes called "in situ". The three components also may be premixed outside the polymerization system and the resulting blend then added to the polymerization system; however, this method generally is less satisfactory than the "in situ" method. The catalyst components also may be preformed, that is, premixed in the presence of a small amount of a conjugated diolefin, prior to being charged to the main portion of the solution that is to be polymerized. The amount of conjugated diolefin which may be present during the preforming of the catalyst can range between about 1:1 to about 1000:1 moles per mole of iron compound, and preferably should be between about 4:1 and 50:1 mole ratio; or about 0.1 to 5.0 percent of total amount to be polymerized.

The concentration of the catalyst employed depends on such factors as purity, rate desired, temperature and other factors. Therefore, specific concentrations cannot be set forth except to say that catalytic amounts are used. Polymerizations have been made using molar ratios of monomer to the iron catalyst ranging between 300:1 to 18,000:1, while the preferred molar ratio is generally between about 600:1 and 3700:1. Some specific concentrations and ratios which produce elastomers having desirable properties will be illustrated in the examples given herein to explain the teachings of this invention.

In general, the polymerizations of this invention are carried out in an inert solvent, and are, thus, solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Dichloromethane, tetrachloroethylene, monochlorobenzene and the like also may be used as the solvent. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent in which the polymer formed is insoluble. Since many of the polymers prepared with this novel catalyst system have relatively high molecular weights, an extender oil may be added to the system and the polymerization conducted in its presence, in which case the oil may serve also as a diluent or polymerization solvent. It should be understood, however, that it is not intended to exclude bulk polymerization from the scope of this application.

It is usually desirable to conduct the polymerizations of this invention employing air-free and moisture-free techniques.

The temperatures employed in the polymerizations of this invention are not critical and may vary from a very low temperature such as −10° C. or below up to high temperatures such as 100° C. or higher. However, it is usually more desirable to employ a more convenient temperature between about 20° C. and about 90° C.

The practice of this invention is further illustrated by reference to the following examples which are intended to be representative rather than restrictive of the scope of this invention. Unless otherwise noted, all parts and percentages are by weight. Dilute solution viscosities (DSV) of the polymers have been determined in toluene at 30° C. Glass transition temperatures (Tg) have been determined using a duPont Model No. 900 Differential Thermal Analyzer. The melting temperature (Tm) of the polymers generally have been determined with the duPont No. 900 DTA, but in a few instances a Perkin-Elmer Differential Scanning Calorimeter was used.

EXAMPLE I

A purified butadiene (BD) in benzene solution containing 100 grams of BD per liter of solution was charged to a series of 4-ounce bottles. The catalysts were charged "in situ" in the amounts listed in Table 1, and the polymerizations were conducted at 50° C. for 21 hours. The catalyst components were added in the following order: (1) triethylaluminum (TEAL); (2) ferric octanoate (FeOct); (3) a sulfur containing ligand as identified in Table 1; Col. 1 shows experiment number, cols. 2-4 amount of catalyst used, col. 5 polymer yield, col. 6 dilute solution viscosity, col. 7 percent gel, col. 8 glass transition temperature and col. 9 microstructure determined by infrared.

Table 1

| Exp. No. | Catalyst Millimole/10 g. BD | | | Yield Wt. % | DSV dl/g. | Gel Wt. % | Tg, °C, | Ir Anal. % trans. 1,4- |
|---|---|---|---|---|---|---|---|---|
| | Teal | FeOct | DDDTO[1] | | | | | |
| 1 | 0.3 | 0.2 | 0.1 | 11 | ND[2] | | | |
| 2 | 0.6 | 0.4 | 0.2 | 27 | 1.21 | 17 | −78 | 84 |
| 3 | 0.6 | 0.4 | 0.6 | 5 | | | | |
| 4 | 1.2 | 0.6 | 0.3 | 60 | 2.66 | 31 | 75 | 73 |
| 5 | 1.2 | 0.6 | 0.6 | 30 | ND | | | |

[1]DDDTO = didodecyldithiooxamide.
[2]ND = not determined.

The infrared analyses as determined by the standard solution method actually reported the following microstructure for Polymer No. 2:- 1% cis-1,4-, 97% trans-1,4- and 17% 1,2-polybutadiene (PBD); and for Polymer No. 4:- 6% cis-1,4-, 80% trans-1,4- and 25% 1,2-PBD. These analyses total more than 100%; the values reported in the right hand column of Table 1 for % trans-1,4-PBD are estimates obtained by normalizing the originally reported analyses to 100%. The estimated infrared analyses did establish that these polymers had at least a moderately high (>70%) trans-1,4-PBD content. The glass transition temperatures (Tg) also indicated that the polymers had moderately high 1,4-PBD contents. X-ray diffraction photographs of these two polymers indicated that they were moderately crystalline and that their structure was primarily trans-1,4-polybutadiene.

EXAMPLE II

A series of polymerizations were conducted in a manner similar to that described in Example I, except that three other dithiooxamides were used as replacements for the didodecyldithiooxamide, and polymerization times were frequently much shorter. The conditions, and also the results, are summarized in Table 2.

Table 2

| Exp. No. | Millimole/10 g.BD | | | Time, Hours | Yield, Wt. % | DSV dl/g. | Gel Wt. % |
|---|---|---|---|---|---|---|---|
| | TEAL | FeOct | DTO[1] | | | | |
| 1 | 1.2 | 0.6 | 0.15 | 0.5 | 53 | ND[4] | |
| 2 | 1.2 | 0.6 | 0.30 | 0.5 | 62 | 6.3 | 28 |
| | | | DMDTO[2] | | | | |
| 3 | 1.2 | 0.4 | 0.2 | 0.5 | 64 | ND | |
| 4 | 1.2 | 0.6 | 0.3 | 0.51 | 87 | 9.5 | 15 |
| | | | DCDTO[3] | | | | |
| 5 | 1.2 | 0.6 | 0.3 | 20 | 27 | ND | |

[1]DTO = dithiooxamide.
[2]DMDTO = dimethyldithiooxamide.
[3]DCDTO = dicyclohexyldithiooxamide.
[4]ND = not determined.

The reported analysis by the solution infrared method for Polymer No. 1 was 27% cis-1,4, 36% trans-1,4- and 57% 1,2-PBD, and for Polymer No. 4 was 33% cis-1,4, 33% trans-1,4 and 50% 1,2-PBD.

EXAMPLE III

A procedure similar to that described in Example I was employed, except that a suspension of thiourea in benzene was utilized as the third catalyst component rather than didodecyldithiooxamide. The ratio of catalyst components charged was TEAL:FeOct:thiourea = 1.2:0.4:0.2 millimole per 10 grams of BD. Polymerization time was 22 hours. Polymer yield was 1.4 grams. The polymer was hard, and had very limited solubility. An infrared analysis, utilizing a film technique, indicated that the polymer was comprised of 52% cis-1,4, 14% trans-1,4- and 34% 1,2-PBD.

EXAMPLE IV

A procedure similar to that described in Example I was employed, except that a suspension of either 2-mercaptobenzimidazole or 2-hydroxybenzimidazole in benzene was utilized as the third catalyst component, and in some experiments, iron neo-decanoate (FeDec) was employed as the source of iron rather than iron octanoate. The conditions and also the results are listed in Table 3.

Table 3

| Exp. No. | Millimole/10g.BD TEAL | FeOct | MBI[1] | Time, Hours | Yield, Wt. % | DSV dl/g. | Gel, Wt. % | IR Anal. % Trans-1,4 |
|---|---|---|---|---|---|---|---|---|
| 1 | 0.6 | 0.2 | 0.10 | 6 | 44 | 5.0 | 12 | ND[4] |
| 2 | 0.6 | 0.3 | 0.05 | 6 | 50 | 5.3 | 16 | 76 |
| 3 | 1.2 | 0.6 | 0.3 | 4 | 64 | 5.0 | 30 | 76 |
| 4 | 1.2 | 0.6 | 0.6 | 20 | 39 | ND | | |
| | | FeDEC | | | | | | |
| 5 | 0.6 | 0.2 | 0.05 | 18 | 30 | 5.0 | 12 | |
| | | | HBI[2] | | | | | |
| 6 | 0.3 | 0.1 | 0.1 | 18 | 46 | 2.4 | 20 | 78 |
| 7 | 0.6 | 0.2 | 0.2 | 18 | 71 | 1.7 | 19 | ND |
| | | FeOCT | BI[3] | | | | | |
| 8 | 0.3 | 0.1 | 0.1 | 19 | Fail | | | |
| 9 | 1.2 | 0.6 | 0.3 | 19 | Fail | | | |

[1]MBI = 2-mercaptobenzimidazole
[2]HBI = 2-hydroxybenzimidazole
[3]BI = benzimidazole
[4]ND = not determined.

Both the 2-mercaptobenzimidazole and the 2-hydroxybenzimidazole resulted in production of polymers which contained moderately large amounts of trans-1,4-polybutadiene. On the other hand, benzimidazole is not a satisfactory ligand, as shown by the results in the bottom of Table 3.

EXAMPLE V

An isoprene in benzene premix was prepared and was purified by passing down a column of silica gel and sparging with nitrogen. The amounts of catalysts indicated in Table 4 were charged to a series of 4-ounce bottles, each containing 10 grams of isoprene per 100 ml. of solution. The polymerizations were conducted at 50° C. for 18 hours. After stopping the polymerizations with Versene Fe-3 and dibutylpara-cresol, the solutions were dried in trays. Polymer yields and DSV's are presented in Table 4.

Table 4

| Exp. No. | Catalyst Millimole/10 g. IP TEAL | FeOct | MBI[1] | Yield, Wt. % | DSV dl/g. | Gel Wt. % |
|---|---|---|---|---|---|---|
| 1 | 1.2 | 0.6 | 0.3 | 70 | 2.00 | 12 |
| 2 | 0.6 | 0.3 | 0.3 | 5 | ND[2] | |
| 3 | 0.6 | 0.3 | 0.15 | 51 | 2.05 | 14 |
| 4 | 0.6 | 0.3 | 0.05 | 13 | ND | |
| 5 | 1.2 | 0.6 | 0.15 | 27 | ND | |

[1]MBI = 2-mercaptobenzimidazole
[2]ND = not determined

The polymer prepared in Experiment No. 3 had a glass transition temperature (Tg) of −54. Its microstructure as determined by NMR analysis was 70% 1,4-, 28% 3,4- and 2% 1,2-polyisoprene.

EXAMPLE VI

Two polymerizations were carried out similar to those in Example V except that dimethyldithiooxamide was used as a catalyst to furnish the ligand rather than 2-mercaptobenzimidazole, and the polymerization time was much shorter. Polymerizations were terminated by adding 5 ml. of methanol and 0.15 g. of dibutyl-para-cresol. Results are presented in Table 5.

Table 5

| Exp. No. | Millimole/10 g. IP TEAL | FeOct | DMDTO[1] | Time, Min. | Yield, Wt. % | DSV dl/g | Gel Wt. % |
|---|---|---|---|---|---|---|---|
| 1 | 1.2 | 0.6 | 0.3 | 45 | 45 | 5.0 | 21 |
| 2 | 0.4 | 0.2 | 0.1 | 100 | 32 | 9.1 | 22 |

[1]DMDTO = dimethyldithiooxamide.

The microstructure of the polymer in Experiment No. 2 was estimated by NMR analysis to be 47% 1,4- and 53% 3,4- polyisoprene. The Tg of the polymer produced in Experiment No. 2 was −32° C.

EXAMPLE VII

A premix solution containing 15.5 percent by volume in hexane of a trans-piperylene fraction (VPC analysis = 95.6 percent trans-, 3.1% cis-piperylene and 1% cyclopentene) was prepared and purified, by passing down a column of silica gel and sparging with nitrogen. To 100 ml. of this premix, which contained about 10 grams of the trans-piperylene fraction, there were added 2.4 ml. of 0.5M TIBAL, 3 ml. of 0.2M. ferric octanoate and 2.2 ml. of 0.067M. suspension of 2-mercaptobenzimidazole in benzene. The mixture was tumbled end-over-end at 50° C. for 20 hours and then the polymerization was stopped by adding Versene Fe-3 and dibutyl-paracresol. After drying, 3.1 grams of a solid rubbery polymer were recovered. It had a DSV of 4.58 dl/g. and its glass transition temperature was -39° C. Its microstructure as determined by NMR analysis was 54% 1,4-, 45% 1,2- and 1% 3,4-polypiperylene.

EXAMPLE VIII

A trans-piperylene fraction which analyzed 88% trans- and 8% cis-piperylene plus 1.3% isoprene, 0.2% 1-pentyne and 2.5% unknowns was used to prepare a premix in hexane which contained 10 g. of the trans-piperylene fraction per 100 ml. of solution. To this solution there was added 2.4 ml. of 0.25 M. TEAL, 1.2 ml. of 0.25 M. ferric octanoate and 1.8 ml. of an 0.083 M. suspension of dithiooxamide in benzene. After 43 hours at 50° C., 1.3 g. of a leathery polymer was obtained. It had a Tg of -6° C.

EXAMPLE IX

Eighty milliliters (80 ml.) of a purified premix containing 7.2 grams of 2,3-dimethylbutadiene in toluene were charged to a 4-ounce bottle. Catalysts were added "in situ" in the following order: (a) 3.5 ml. of 0.25 M. TEAL, (b) 1.7 ml. of 0.25 M. iron octanoate and (c) 1.3 ml. of 0.083 suspension of dithiooxamide in benzene. The sealed bottle was tumbled end-over-end in a water bath at 50° C. for 4 hours. A high molecular weight, tough, plastic-like polymer was obtained; the weight was 3.3 grams. The polymer had limited solubility in hydrocarbons. NMR analysis reported that it was comprised of 83% 1,4- and 17% 1,2-polydimethylbutadiene.

While certain representative embodiments and details have been shown for the purpose of illustrating the invention it will be apparent to those skilled in this art that various changes and modifications may be made therein without departing from the spirit or scope of the invention.

What is claimed is:

1. A catalyst composition consisting essentially of (1) an iron compound selected from the group consisting of ferric oxalate, ferric hexanoate, ferric octanoate, ferric decanoate, ferric stearate, ferric naphthenate, ferrous acetylacetonate, ferric acetylacetonate, ferric-1-ethoxy-1,3-butanedionate, ferrous dimethyl glyoxime, ferric chloride, ferrous chloride, ferric bromide, ferric phosphate, iron tetracarbonyl, iron pentacarbonyl and iron nonacarbonyl, (2) an organometallic compound selected from the group consisting of trialkylaluminums, dialkylaluminum halides, dialkylaluminum hydrides and dialkylaluminum alkoxides, and (3) a sulfur containing ligand selected from the group consisting of N,N'-dimethyldithiooxamide, dithiooxamide, N,N'-dicyclohexyldithiooxamide, N,N'-didodecyldithiooxamide, 2-mercaptobenzimidazole, 5-methyl-2-mercaptobenzimidazole, 5-chloro-2-mercaptobenzimidazole, thiourea and N,N'-diphenylthiourea, in which the molar ratio of the sulfur ligand to the iron compounds (S/Fe) ranges from about 0.1/1 to about 100/1 and when the organometallic compound is an aluminum trialkyl, the molar ratio of the aluminum trialkyl to the iron compound (Al/Fe) ranges from about 1/1 to about 400/1 and when the organometallic compound is a dialkylaluminum halide or a dialkylaluminum hydride, or a dialkylaluminum alkoxide, then the organometallic component to the iron component (AlX/Fe) can be varied from about 6/1 to about 25/1.

2. The composition according to claim 1 in which the iron compound is selected from the group consisting of ferric octanoate, ferric decanoate, ferric naphthenate and ferric acetylacetonate and the sulfur containing ligand is selected from the group consisting of 2-mercaptobenzimidazole, dithiooxamide, N,N'-dimethyldithiooxamide and N,N'-didodecyldithiooxamide, and in which when the organometallic compound is a trialkylaluminum, the mole ratio of the trialkylaluminum compound to the iron compound (Al/Fe) ranges from about 1/1 to about 4/1, and when the organometallic compound is a dialkylaluminum halide or a dialkylaluminum hydride or a dialkylaluminum alkoxide, the molar ratio of the organometallic compound to the iron compound (AlX/Fe) ranges from about 6/1 to about 12/1.

* * * * *